(12) United States Patent
Hiraoka

(10) Patent No.: US 9,546,288 B2
(45) Date of Patent: Jan. 17, 2017

(54) RADICAL POLYMERIZABLE COMPOSITION, INKJET INK, INK CARTRIDGE, COATING METHOD AND COATED MATTER

(71) Applicant: Takao Hiraoka, Kanagawa (JP)

(72) Inventor: Takao Hiraoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/207,292

(22) Filed: Jul. 11, 2016

(65) Prior Publication Data

US 2016/0319140 A1   Nov. 3, 2016

Related U.S. Application Data

(63) Continuation of application No. 14/702,831, filed on May 4, 2015, now Pat. No. 9,428,657.

(30) Foreign Application Priority Data

May 19, 2014   (JP) ................. 2014-103516

(51) Int. Cl.
| | | |
|---|---|---|
| *C09D 183/06* | (2006.01) | |
| *C09D 11/101* | (2014.01) | |
| *C09D 11/107* | (2014.01) | |
| *C09D 11/30* | (2014.01) | |
| *B05D 3/06* | (2006.01) | |

(52) U.S. Cl.
CPC ............. *C09D 11/101* (2013.01); *B05D 3/067* (2013.01); *C09D 11/107* (2013.01); *C09D 11/30* (2013.01); *C09D 183/06* (2013.01)

(58) Field of Classification Search
CPC ..... C09D 11/101; C09D 11/107; C09D 11/30; C09D 183/06
See application file for complete search history.

(56) References Cited

U.S. PATENT DOCUMENTS

| | | |
|---|---|---|
| 2011/0092649 A1 | 4/2011 | Hoya |
| 2012/0283378 A1 | 11/2012 | Shoshi et al. |
| 2012/0293589 A1 | 11/2012 | Hiraoka |
| 2013/0321539 A1 | 12/2013 | Hiraoka |
| 2014/0002539 A1 | 1/2014 | Goto et al. |
| 2014/0125744 A1 | 5/2014 | Hiraoka |
| 2014/0139596 A1 | 5/2014 | Hiraoka |
| 2014/0139597 A1 | 5/2014 | Hiraoka |
| 2014/0240414 A1 | 8/2014 | Hiraoka |
| 2014/0311380 A1 | 10/2014 | Hiraoka |
| 2014/0320572 A1 | 10/2014 | Hiraoka |
| 2014/0327719 A1 | 11/2014 | Hiraoka |
| 2014/0336298 A1 | 11/2014 | Hiraoka |
| 2014/0338562 A1 | 11/2014 | Hiraoka |
| 2015/0009265 A1 | 1/2015 | Kohzuki et al. |
| 2015/0042731 A1 | 2/2015 | Hiraoka |
| 2015/0091986 A1 | 4/2015 | Seno et al. |

FOREIGN PATENT DOCUMENTS

| | | |
|---|---|---|
| JP | 2004-526820 | 9/2004 |
| JP | 2008-248220 | 10/2008 |
| JP | 2010-161186 | 7/2010 |
| JP | 2012-207202 | 10/2012 |
| JP | 2013-181114 | 9/2013 |
| JP | 2013-184453 | 9/2013 |
| WO | WO 02/061001 A1 | 8/2002 |

OTHER PUBLICATIONS

Light Hammer 6 data sheet, Heraeus Noblelight Fusion UV Inc., from www.fusionuv.com.*
U.S. Appl. No. 14/492,208, filed Sep. 22, 2014.
English language translation (machine generated) JP 2012-124340, Jun. 2012.

* cited by examiner

*Primary Examiner* — Margaret Moore

(74) *Attorney, Agent, or Firm* — Oblon, McClelland, Maier & Neustadt, L.L.P.

(57) ABSTRACT

A radical polymerizable composition includes a siloxane compound represented by a formula $(HO)_2(R)Si.O[-Si(R)(OH).O-]n-Si(R)(OH)_2$ in which R represents a methacryloyl group; and n represents 0 or 1; and a monomer having a viscosity lower than that of the siloxane compound. The composition is preferably cured with UV light from an LED.

11 Claims, 1 Drawing Sheet

RADICAL POLYMERIZABLE COMPOSITION, INKJET INK, INK CARTRIDGE, COATING METHOD AND COATED MATTER

CROSS REFERENCE TO RELATED APPLICATION

This application is a continuation of U.S. application Ser. No. 14/702,831, filed on May 4, 2015, and claims priority to Japanese Patent Application 2014-103516, filed on May 19, 2014 and now U.S. Pat. No. 9,428,657.

BACKGROUND

Technical Field

The present invention relates to a radical polymerizable composition, a radical polymerizable coating, a radical polymerizable ink, an ink cartridge containing the ink, a coating method and a coated matter.

Description of the Related Art

PCT Japanese published national phase application No. 2004-526820 discloses a widely-known photopolymerizable composition such as a photopolymerizable inkjet ink using (meth)acrylic acid ester. Japanese published unexamined application No. JP-2013-181114-A discloses a coating liquid having such a viscosity as to easily be dischargeable from a nozzle head or a spray gun, and capability of firmly protecting a substrate.

It is known that a material having a siloxane chain structure is used as a material of an inkjet ink composition. For example, Japanese published unexamined application No. JP-2008-248220-A discloses polyester-modified or polyether-modified silicone is added to an inkjet ink as a surfactant to disperse a nonaqueous resin emulsion in alkylene glycol as an organic solvent. Japanese published unexamined application No. JP-2010-161186-A discloses adding polyether-modified silicone and/or fluorine-containing ethylene compound as a lubricant to a photopolymerizable composition for forming a transfer sheet having good releasability from a mold having a microscopic concave and convex patterns. Further, in order to prevent an inkjet ink from penetrating in a paper substrate and swelling the substrate to curl, Japanese published unexamined application No. JP-2012-207202-A discloses an inkjet ink including polyol having an equilibrium water content not greater than 30% at TH 80%, amide compound having the following formula:

wherein R Represents an alkyl group having 4 to 6 carbon atoms, a liquid compound having a specific ether structure and/or a specific dicarboxylic acid ester structure, and a fluorine-containing surfactant and/or a polyether modified silicone surfactant.

In terms of protecting the surface of a substrate, sufficiently high coating strength is one of important functions.

For examples, (meth)acrylate materials having polyurethane skeletons are marketed. Some of them are said to be suitable for hard coat applications and have very high surface hardness in pencil hardness test of JIS standard mentioned later. However, they unexceptionally have very high viscosities of from some ten to hundred thousands Pa·s, and a photopolymerizable composition supposed to be used even in an inkjet ink, having a practical range of low viscosity can scarcely include them in fact. Further, polyurethane including many nitrogen atoms in its molecule noticeably becomes yellowish as time passes.

Not only when the photopolymerizable composition is used for spray coating or bar coating, but also when used for an inkjet ink, unless raw materials of the photopolymerizable composition, i.e., monomer materials have sufficiently low viscosity, the photopolymerizable composition is difficult to have a practical range of low viscosity.

A dilution solvent enables the photopolymerizable composition to have low viscosity. It is preferable not to add a solvent to the photopolymerizable composition in consideration of bad influence of the volatilized solvent against environment. Water enables the photopolymerizable composition to have low viscosity as well using a hydrosoluble monomer. However, penetration drying cannot be expected from a plastic substrate and water needs volatilizing when print coating process is accelerated, which typically needs an unpreferable heat source unpreferable in terms of saving energy.

SUMMARY

Accordingly, one object of the present invention is to provide a photopolymerizable composition having sufficiently low viscosity with a dilution monomer, usable for inkjet application, and forming a coating film keeping good contactness to a plastic substrate and having high surface strength.

Another object of the present invention is to provide a coating method of the photopolymerizable composition.

A further object of the present invention is to provide a coated matter using the photopolymerizable composition.

These objects and other objects of the present invention, either individually or collectively, have been satisfied by the discovery of a radical polymerizable composition, including a siloxane compound represented by the following formula (1):

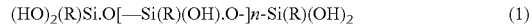

$$(HO)_2(R)Si.O[—Si(R)(OH).O-]n-Si(R)(OH)_2 \quad (1)$$

wherein R represents a methacryloyl group; and n represents 0 or 1; and a monomer having a viscosity lower than that of the siloxane compound.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
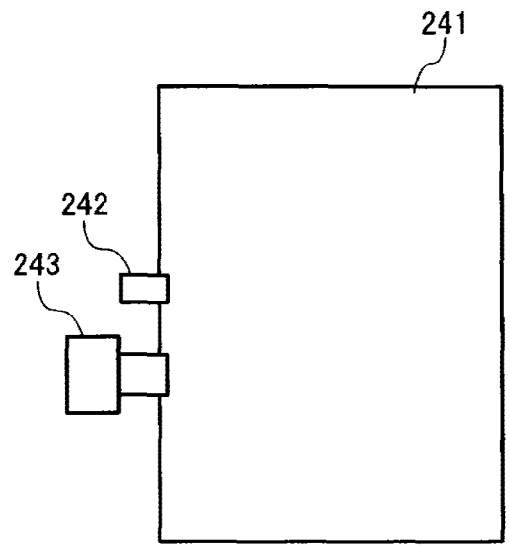
FIG. 1 is a schematic view illustrating an example of an ink bag of the ink cartridge of the present invention.

The present invention provides a photopolymerizable composition having sufficiently low viscosity with a dilution monomer, usable for inkjet application, and forming a coating film keeping good contactness to a plastic substrate and having high surface strength.

More particularly, the present invention relates to a radical polymerizable composition, including a siloxane compound represented by the following formula (1):

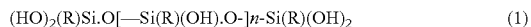

$$(HO)_2(R)Si.O[-Si(R)(OH).O-]n\text{-}Si(R)(OH)_2 \quad (1)$$

wherein R represents a methacryloyl group; and n represents 0 or 1; and a monomer having a viscosity lower than that of the siloxane compound.

Although the compound having the structure represented by the above formula does not have such high viscosity as that of polyurethane, it cannot be used as an inkjet ink alone. Therefore, a dilution monomer is needed to make the compound have lower viscosity so as to be used as an inkjet ink.

The dilution monomer has low viscosity and naturally has low molecular weight. Most of inexpensive and general-purpose (meth)acrylates having low molecular weight have skin sensitization causing swelling and itch of skin. Therefore, when a photopolymerizable composition having low viscosity using (meth)acrylates is formed, (meth)acrylates preferably have no problem of skin sensitization as low-viscosity (meth)acrylates used for dilution. For that reason, diethyleneglycol dimethacrylate having no skin sensitization problem is preferably used as a monomer to lower the viscosity.

The siloxane compound represented by the formula (1), i.e., $(HO)_2(R)Si.O[-Si(R)(OH).O-]n\text{-}Si(R)(OH)_2$, wherein R represents a methacryloyl group; and n represents 0 or 1 has very high viscosity and is thought difficult to penetrate into skin. Except for a few examples such as diethyleneglycol dimethacrylate, the siloxane compound has obviously has lower skin sensitization than the low-viscosity (meth)acrylates used for dilution.

The photopolymerizable composition negative for skin sensitization refers to a compound satisfying at least one of the following (1) or (2):

(1) a compound having a Stimulation Index (SI value) of less than 3, where the Stimulation Index indicates the level of sensitization as measured by a skin sensitization test based on the LLNA (Local Lymph Node Assay);

(2) a compound evaluated as "negative for skin sensitization" or "no skin sensitization" in its MSDS (Material Safety Data Sheet).

Regarding the above (1), the compound having the SI value of less than 3 is considered as negative for skin sensitization as described in literatures, for example, "Functional Material" (Kino Zairyou) 2005, September, Vol. 25, No. 9, p. 55. The lower SI value means the lower level of skin sensitization. Thus, in the present invention, a monomer having the lower SI value is preferably used. The SI value of the monomer used is preferably less than 3, more preferably 2 or lower, and even more preferably 1.6 or lower.

When the siloxane compound represented by the formula (1), i.e., $(HO)_2(R)Si.O[-Si(R)(OH).O-]n\text{-}Si(R)(OH)_2$, wherein R represents a methacryloyl group; and n represents 0 or 1 is (A1) of siloxane compounds (A), diethyleneglycol dimethacrylate is an acrylic monomer (B) and a polymerization initiator is (C), the content of (A1) is preferably from 20 to 50 parts by weight, the content of (B) is preferably from 50 to 80 parts by weight, and the content of (C) is preferably from 5 to 20 parts by weight per total 100 parts by weight of (A1) and (B).

The following (meth)acrylates, (meth)acryl amides and vinylethers can be used together for the photopolymerizable composition as long as the effect of the present invention is not impaired.

N-pentyl(meth)acrylate, n-hexyl(meth)acrylate, ethylene glycol di(meth)acrylate, hydroxypivalic acid neopentyl glycol di(meth)acrylate, γ-butyrolactone acrylate, isobornyl (meth)acrylate, formulated trimethylol propane mono(meth) acrylate, polytetramethylene glycol di(meth)acrylate, trimethylol propane (meth)acrylic acid benzoate, diethylene glycol diacrylate, triethylene glycol diacrylate, tetraethylene glycol diacrylate, polyethylene glycol diacrylate $[CH_2=CH-CO(OC_2H_4)_n-OCOCH=CH_2$ (n≈9)], $[CH_2=CH+CO(OC_2H_4)_n-OCOCH=CH_2$ (n≈14)], $[CH_2=CH-CO(OC_2H_4)_n-OCOCH=CH_2$ (n≈23)], dipropylene glycol di(meth)acrylate, tripropylene glycol di(meth)acrylate, polypropylene glycol dimethacrylate $[CH_2=C(CH_3)-CO-(OC_3H_6)_n-OCOC(CH_3)=CH_2$ (n≈7)], 1,3-butanediol diacrylate, 1,4-butanediol di(meth) acrylate, 1,6-hexanediol di(meth)acrylate, 1,9-nonanediol di(meth)acrylate, neopentyl glycol di(meth)acrylate, tricyclodecane dimethanol diacrylate, propylene oxide-modified bisphenol A di(meth)acrylate, polyethylene glycol di(meth) acrylate, dipentaerythritol hexa(meth)acrylate, (meth)acryloyl morpholine, 2-hydroxypropyl (meth)acryl amide, propylene oxide-modified tetramethylol methane tetra(meth) acrylate, dipentaerythritol hydroxypenta(meth)acrylate, caprolactone-modified dipentaerythritol hydroxypenta (meth)acrylate, ditrimethylol propane tetra(meth)acrylate, pentaerythritol tetra(meth)acrylate, trimethylol propane acrylate, ethylene oxide-modified trimethylol propane triacrylate, propylene oxide-modified trimethylol propane tri (meth)acrylate, caprolactone-modified trimethylol propane tri(meth)acrylate, pentaerythritol tri(meth)acrylate, tris(2-hydroxyethyl)isocyanurate tri(meth)acrylate, ethoxylated neopentyl glycol di(meth)acrylate, propylene oxide-modified neopentyl glycol di(meth)acrylate, propylene oxide-modified glyceryl tri(meth)acrylate, polyester di(meth)acrylate, polyester tri(meth)acrylate, polyester tetra(meth) acrylate, polyester penta(meth)acrylate, polyester poly (meth)acrylate, N-vinyl caprolactam, N-vinyl pyrrolidone, N-vinyl formamide, polyurethane di(meth)acrylate, polyurethane tri(meth)acrylate, polyurethane tetra(meth)acrylate, polyurethane penta(meth)acrylate and polyurethane poly(meth)acrylate, triethylene glycol divinylether, cyclohexane dimethanol divinylether, cyclohexane dimethanol monovinyl ether, diethylene glycol divinylether, dicyclopentadiene vinylether, tricyclodecane vinylether, benzyl vinylether, ethyl oxetane methyl vinylether, triethylene glycol divinylether, ethyl vinylether, etc.

The (meth)acrylic acid esters, the (meth)acryl amides and their derivatives and the vinylether compounds are known to have an ionic polymerizability as well. The ionic polymerization initiators are generally expensive and generate a slight amount of strong acid or strong alkali even in the state where they are not irradiated with light. Thus, it is necessary to take special cares such as imparting acid resistance and alkali resistance to an ink supply channel of an inkjet coating system, imposing limitation on the choice of members constituting the inkjet coating system. In contrast, the ink of the present invention can use a photoradical polymerization initiator that is inexpensive and generates no strong acid or strong alkali. Thus, it is possible to produce an ink at low cost, and also it is easy to choose members of an inkjet coating system. When using a quite high energy light source, such as electron beams, α rays, β rays, γ rays or X rays, polymerization reaction can proceed without polymerization initiator. Since this is a conventionally known matter, the equipment is very expensive and the maintenance is complicated, this not described in detail in the present invention.

Photoradical polymerization initiators include, but are not limited to, a self-cleaving photopolymerization initiator and a hydrogen-abstracting polymerization initiator.

Specific examples of the self-cleaving photopolymerization initiator include, but are not limited to, 2,2-dimethoxy-1,2-diphenylethane-1-one, 1-hydroxy-cyclohexyl-phenylketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methylpropionyl)benzyl]phenyl}-2-methyl-1-propan-1-one, phenylglyoxylic acid methyl ester, 2-methyl-1-[4-(methylthio)phenyl]-2-morpholinopropan-1-one, 2-benzyl-2-dimethylamino-1-(4-morpholinophenyl)butanone-1,2-dimethylamino-2-(4-methylbenzyl)-1-(4-morpholin-4-yl-phenyl)butane-1-one, bis(2,4,6-trimethylbenzoyl)phenyl phosphine oxide, bis(2,6-dimethoxybenzoyl)-2,4,4-trimethyl-pentylphosphine oxide, 2,4,6-trimethylbenzoylphosphine oxide, 1,2-octanedion-[4-(phenylthio)-2-(o-benzoyloxime)], ethanone-1-[9-ethyl-6-(2-methylbenzoyl)-9H-carbazol-3-yl]-1-(O-acetyloxime), and [4-(methylphenylthio)phenyl]phenylmethanone.

Specific examples of the hydrogen-abstracting polymerization initiator include, but are not limited to, benzophenone compounds such as benzophenone, methylbenzophenone, methyl-2-benzoylbenzoate, 4-benzoyl-4'-methyldiphenyl sulfide and phenylbenzophenone; and thioxanthone compounds such as 2,4-diethylthioxanthone, 2-chlorothioxanthone, isopropylthioxanthone and 1-chloro-4-propylthioxanthone.

Amines can be used together as a polymerization accelerator.

Specific examples thereof include, but are not limited to, p-dimethylaminobenzoate, 2-ethylhexyl p-dimethylaminobenzoate, methyl p-dimethylaminobenzoate, 2-dimethylaminoethyl benzoate and butoxyethyl p-dimethylaminobenzoate.

The polymerizable composition of the present invention may be transparent without including a colorant, and may include a colorant when necessary. When the photopolymerizable composition is desired to be colorless or white, materials having less color are preferably used besides the polymerization initiator, the polymerization accelerator and the colorant.

Known inorganic pigments and organic pigments can be used as a colorant coloring the photopolymerizable composition.

Specific examples of black pigments include, but are not limited to, carbon black produced by a furnace method of a channel method.

Specific examples of yellow pigments include, but are not limited to, pigments of Pigment Yellow series, such as Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, Pigment Yellow 180 and Pigment Yellow 185.

Specific examples of magenta pigments include, but are not limited to, pigments of Pigment Red series, such as Pigment Red 5, Pigment Red 7, Pigment Red 12, Pigment Red 48(Ca), Pigment Red 48(Mn), Pigment Red 57(Ca), Pigment Red 57:1, Pigment Red 112, Pigment Red 122, Pigment Red 123, Pigment Red 168, Pigment Red 184, Pigment Red 202, and Pigment Violet 19.

Specific examples of cyan pigments include, but are not limited to, pigments of Pigment Blue series, such as Pigment Blue 1, Pigment Blue 2, Pigment Blue 3, Pigment Blue 15, Pigment Blue 15:3, Pigment Blue 15:4, Pigment Blue 16, Pigment Blue 22, Pigment Blue 60, Vat Blue 4, and Vat Blue 60.

(Filler)

The strength of the hardened material in the present invention depends on the strength thereof and a bonding strength between the surface of the substrate and the material. Typically, it is said, the higher the crosslinking density, the lower the volume contraction. The filler is effectively used to improve properties of the hardened material such as increase of hardness and heat resistance, prevention of volume contraction due to crosslink, and reduction of linear inflation.

Specific examples of white pigments or the uncolored filler for improving properties of the hardened material include, but are not limited to, sulfuric acid salts of alkaline earth metals such as barium sulfate; carbonic acid salts of alkaline earth metals such as calcium carbonate; silica such as fine silicic acid powder and synthetic silicic acid salts; calcium silicate; alumina; alumina hydrate; titanium oxide; zinc oxide; talc; and clay.

In addition, various inorganic or organic pigments may be optionally used considering, for example, physical properties of the photopolymerizable composition. (polymerization inhibitor, surfactant, dispersants, etc.)

Further, in the photopolymerizable composition, a polymerization inhibitor (e.g., 4-methoxy-1-naphthol, methylhydroquinone, hydroquinone, t-butylhydroquinone, di-t-butylhydroquinone, methoquinone, 2,2'-dihydroxy-3,3'-di($\alpha$-methylcyclohexyl)-5,5'-dimethyldiphenylmethane, p-benzoquinone, di-t-butyl diphenylamine, and 9,10-di-n-butoxyanthracene, 4,4'-[1,10-dioxo-1,10-decandiylbis(oxy)]bis[2,2,6,6-tetramethyl]-1-piperidinyloxy), a surfactant (e.g., higher fatty acid ester containing polyether, an amino group, a carboxyl group, or a hydroxyl group, a polydimethylsiloxane compound containing, in its side chain or terminal, polyether, an amino group, a carboxyl group, or a hydroxyl group, and a fluoroalkyl compound containing a polyether residue, an amino group, a carboxyl group, and a hydroxyl group), and a polar group-containing polymer pigment dispersant may be optionally used.

When the polymerizable composition of the present invention is used as an inkjet ink, properties thereof preferably conform to required specification of the inkjet ejection head. Various ejection heads are marketed from many manufacturers, and some of them have large ejection power to eject an ink having high viscosity and wide thermostat.

The ink preferably has a viscosity of from 2 to 150 mPa·s, and more preferably from 5 to 18 mPa·s at 25° C. However, the thermostat of the ejection head can be used. When the viscosity is too high at 25° C., the head may be heated when necessary to make the ink have lower viscosity. When heated at from 45 to 60° C., the ink preferably has a viscosity of from 5 to 18 mPa·s thereat.

The ink of the present invention can be housed in a container, and used as an ink cartridge. With this form, users do not have to directly touch the ink during operations, such as exchange of the ink, and thus there is no concern about staining of their fingers, hands, clothes, etc. In addition, it is possible to prevent interfusion of foreign matter such as dust into the ink.

The container is not particularly limited, and a shape, structure, size, and material thereof can be appropriately selected depending on the intended purpose. As for the container, for example, preferred is a container having an ink bag formed of an aluminum laminate film, or a resin film.

Figure 2:
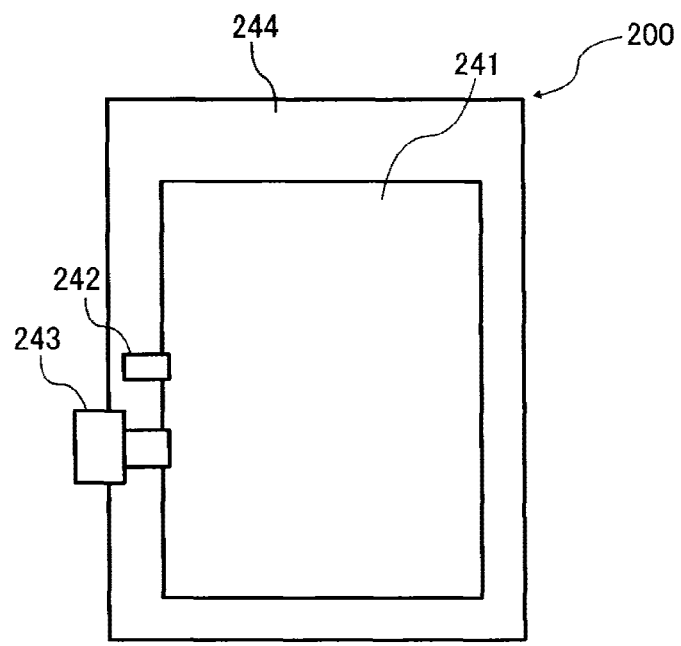
FIG. 2 is a schematic view illustrating an example of the ink cartridge of the present invention housing the ink bag.

The ink cartridge will be explained with reference to FIGS. 1 and 2. FIG. 1 is a schematic diagram illustrating one example of an ink bag 241 of the ink cartridge, and FIG. 2 is a schematic diagram illustrating the ink cartridge 200, in which the ink bag 241 of FIG. 1 is housed in a cartridge case 244.

As illustrated in FIG. 1, the ink bag 241 is filled with the ink by injecting the ink from an ink inlet 242. After removal of air present inside the ink bag 241, the ink inlet 242 is sealed by fusion bonding. At the time of use, a needle attached to the main body of the device is inserted into an ink outlet 243 formed of a rubber member to supply the ink to the device therethrough. The ink bag 241 is formed of a wrapping member such as an air non-permeable aluminum laminate film. As illustrated in FIG. 2, the ink bag 241 is typically housed in a plastic cartridge case 244, which is then detachably mounted in various inkjet recording devices to thereby use as the ink cartridge 200.

The ink cartridge of the present invention is preferably detachably mounted in inkjet recording devices. The ink cartridge can simplify the refill and exchange of the ink to improve workability.

Substrates to be printed are not particularly limited, but polycarbonate, ABS, polyvinylchloride, polystyrene or their combinations are preferably used because of having good contactness with the ink. The substrates may have the shape of a roll or a sheet.

Not only one side but also both sides of the substrate may be coated.

UV light is irradiated to the substrate to be printed in consideration of heat damage to be hardened in light irradiation process. General-purpose light sources such as high pressure mercury lamps and halide lamps or a UVLED light source having gathered attention for the purpose of saving energy and space may be used.

Particularly, substrates to be printed requiring surface protection are impermeable (non-porous) metallic materials, resin materials, and plastic materials having good moldability and shock resistance in many case. Specific properties of these plastic materials are generally contrary to the surface strength, and therefore it is required that the photopolymerizable composition is coated on the surfaces of the substrates to protect them. Specific examples of the typical materials used in such applications include the above polycarbonate, ABS, polyvinylchloride, polystyrene or their combinations, etc.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

<Evaluation Method of SI Value>

According to the skin sensitization test based on the LLNA (Local Lymph Node Assay), the SI value was measured in the manner described below.

[Test Material]
<<Positive Control>>
α-hexylcinnamaldehyde (HCA; product of Wako Pure Chemical Industries, Ltd.) was used as the positive control.
<<Medium>>
As a medium, a mixture containing acetone (product of Wako Pure Chemical Industries, Ltd.) and olive oil (product of Fudimi Pharmaceutical Co., Ltd.) in a volume ratio of 4/1 was used.
<<Animals Used>>
Before treated with the test substances, the positive control or the medium control, female mice were acclimated for 8 days including 6-day quarantine. No abnormalities were found in all the mice (used animals) during the quarantine/acclimation period.

Based on the body weights measured 2 days before the initiation of sensitization, they were categorized into 2 groups (4 mice/group) by the body weight stratified random sampling method so that the body weight of each individual was within ±20% of the average body weight of all the individuals. Each of the used animals was 8 weeks old to 9 weeks old at the time of the initiation of sensitization. The individuals remaining after the categorization were excluded from the test.

The used animals were individually identified by application of oil ink to their tale throughout the test period, and also their cages were labeled for identification.
<<Housing Environment>>
Throughout the housing period including the quarantine/acclimation period, the used animals were housed in an animal room with barrier system, which was set as follows: 21° C. to 25° C. in temperature, 40% to 70% in relative humidity, 10 times/hour to 15 times/hour in frequency of air circulation, and a 12 hour-interval lighting cycle (lighting from 7:00 to 19:00).

The housing cages used were those made of polycarbonate, and four animals were housed in each cage.

The used animals were given ad libitum solid feed for laboratory animals MF (product of Oriental Yeast Co., Ltd.). Also, using a water-supply bottle, the used animals were given ad libitum tap water in which sodium hypochlorite (PURELOX, product of OYALOX Co., Ltd.) had been added so that the chlorine concentration was about 5 ppm. Bedding used was SUNFLAKE (fir tree, shavings obtained with a power planer) (product of Charles River Inc.). The feed and all of the feeding equipment were sterilized with an autoclave (121° C., 30 min) before use.

The housing cage and the bedding were replaced with new ones at the times of the categorization and the removal of the auricular lymph node (i.e., the time when the animals were transferred from the animal room), and the water-supply bottle and rack were replaced with new ones at the time of the categorization.

[Test Method]
<<Group Composition>>
The group compositions of the medium control group and positive control group used for the measurement of the Si value are shown in Table 1.

TABLE 1

| Test group | Sensitization substance | Sensitization dose (μL/auricle) | Times of sensitization | Number of animals (animal No.) |
| --- | --- | --- | --- | --- |
| Medium control group | Medium only | 25 | Once/day × 3 days | 4 (1-4) |
| Positive control group | 25.0% HCA | 25 | Once/day × 3 days | 4 (5-8) |

[Preparation]

<<Test Substance>>

Table 2 shows the amount of the test substance. The test substance was weighed in a measuring flask, and the volume of the test substance was adjusted to 1 mL with the medium. The thus-prepared test substance preparation was placed in a light-shielded airtight container (made of glass).

TABLE 2

|  | Concentration after adjustment (w/v%) | Mass of test substance (g) |
|---|---|---|
| Test substance | 50.0 | 0.5 |

<<Positive Control Substance>>

About 0.25 g of HCA was accurately weighed, and the medium was added to the HCA to have the volume of 1 mL, to thereby prepare a 25.0% by mass solution. The thus-prepared positive control substance preparation was placed in a light-shielded airtight container (made of glass).

<<BrdU>>

In a measuring flask, 200 mg of 5-bromo-2'-deoxyuridine (BrdU, product of NACALAI TESQUE, INC.) was accurately weighed in a measuring flask. Then, physiological saline (product of OTSUKA PHARMACEUTICAL CO., LTD.) was added to the measuring flask, and dissolved through application of ultrasonic waves. Thereafter, the volume of the resultant solution was adjusted to 20 mL to prepare a 10 mg/mL solution (BrdU preparation). The BrdU preparation was sterilized through filtration with a sterilized filtration filter and placed in a sterilized container.

<<Preparation Day and Storage Period>>

The positive control preparation was prepared on the day before the initiation of sensitization, and stored in a cold place except in use. The medium and the test substance preparations were prepared on the day of sensitization. The BrdU preparation was prepared 2 days before administration and stored in a cold place until the day of administration.

[Sensitization and Administration of BrdU]

<<Sensitization>>

Each (25 μL) of the test substance preparations, the positive control preparation or the medium was applied to both the auricles of each of the used animals using a micropipetter. This treatment was performed once a day for three consecutive days.

<<Administration of BrdU>>

About 48 hours after the final sensitization, the BrdU preparation (0.5 mL) was is intraperitoneally administered once to each of the used animals.

[Observation and Examination]

<<General Conditions>>

All the used animals used for the test were observed once or more times a day from the day of the initiation of sensitization to the day of the removal of the auricular lymph node (i.e., the day when the animals were transferred from the animal room). Notably, the observation day was counted from the day of the initiation of sensitization being regarded as Day 1.

<<Measurement of Body Weights>>

The body weight of each of the used animals was measured on the day of the initiation of sensitization and on the day of the removal of the auricular lymph node (i.e., the day when the animals were transferred from the animal room). Also, the average of the body weights and the standard error thereof were calculated for each group.

<<Removal of Auricular Lymph Node and Measurement of Weight Thereof>>

About 24 hours after the administration of BrdU, the used animals were allowed to undergo euthanasia, and their auricular lymph nodes were sampled. The surrounding tissue of each auricular lymph node was removed, and the auricular lymph nodes from both the auricles were collectively weighed. Also, the average of the weights of the auricular lymph nodes and the standard error thereof were calculated for each group. After the measurement of the weights, the auricular lymph nodes of each individual were stored in a frozen state using a BIO MEDICAL FREEZER set to −20° C.

<<Measurement of BrdU Intake>>

After returning the auricular lymph nodes to room temperature, the auricular lymph nodes were mashed with the gradual addition of physiological saline, and suspended therein. The thus-obtained suspension was filtrated and then dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, product of Roche Diagnostics Inc.). A multiplate reader (FLUOSTAR OPTIMA, product of BMG LABTECH Inc.) was used to measure the absorbance of each well (OD: 370 nm to 492 nm, the intake of BrdU), and the average of the absorbance of the 3 wells for each individual was used as the measurement of BrdU for the individual.

[Evaluation of Results]

<<Calculation of Stimulation Index (SI)>>

As shown in the following formula, the measurement of BrdU intake for each individual was divided by the average of the measurements of BrdU intake in the vehicle control group to calculate the SI value for the individual. The SI value of each test group was the average of the SI values of the individuals. Also, the standard error of the SI values was calculated for each test group. Notably, the SI value was rounded at the second decimal place and shown to the first decimal place.

$$SI = \frac{\text{Average of measurements of } BrdU \text{ intake for each individual (average of 3 wells)}}{\text{Average of measurements of } BrdU \text{ intake in the vehicle control group (average of 4 animals)}}$$

Example 1

The following materials A to C were mixed at weight ratios shown in Table 3 to prepare an ink of Example 1.

Details of A1-2, B1-2 and C1-2 are as follows. The value in ( ) at the end is a SI value in the (1) LLNA test. "Negative" or "None" means "Skin sensitization is negative" or "No skin sensitization" in the (2) or (3) MSDS. "Yes" means MSDS discloses data showing skin sensitization is positive.

(A) Modified Siloxane Compound

A1: the siloxane compound represented by the formula (1): $(HO)_2(R)Si.O[-Si(R)(OH).O-]_n\text{-}Si(R)(OH)_2$, wherein R represents a methacryloyl group; and n represents 0 or 1 (Silixan M100J from Kusumoto Chemicals, Ltd., having a viscosity of 5400 mPa·s at 25° C.).

A2: a compound having an acryloyl group bonded through an alkylether bond with a Si atom at the end of siloxane chain and a siloxane structural unit of (—Si(R)(R).O-)n (R=CH3, n=1 to 2) (UV3500 from BYK-Chemie GmbH, having a viscosity of 470 mPa·s at 25° C.).

(B) Low-Viscosity (Meth)Acrylate

B1: Diethyleneglycol dimethacrylate 2G from Shin-Nakamura Chemical Co., Ltd., having a viscosity of 5 mPa·s at 25° C. (1.1)

B2: Diethyleneglycol diacrylate from Sigma-Aldrich Corp., having a viscosity of 5 mPa·s at 25° C. (Yes)

(C) Photo-Radical Polymerization Initiator

C1: 1-hydroxycyclohexylphenylketone Irgacure 184 from BASF. (None)

C2: 2-dimethylamino-2-(4-methylbenzyl)-1-(4-morpholin-4-yl-phenyl)butane-1-one Irgacure 379 from BASF. (None)

After each of the photopolymerizable compositions was coated by bar coating and inkjet ejection on a marketed polycarbonate plate (Panlite PC1151N having a thickness of 0.5 mm) widely used in applications such as chases because of its moldability and shock resistance to form a film thereon, the film was irradiated with a predetermined accumulated light quantity (UV light in UVA area at 270 W/cm$^2$) by a UV irradiator LH6 (H bulb) from Fusion Systems Japan, Co., Ltd. to be cured. One day later, the contactness and the strength of the film were evaluated.

The contactness was evaluated according to cross cut method specified in JIS-K-5600-5-6. In JIS standard, contactness to a substrate is expressed by the terms of adherence. These are technically the same. It was "good" when no peeling from the interface or only a small peeling at an intersection of cut was observed. It was "poor" when peeling of cell is apparently observed. It was unevaluable when it was difficult to precisely evaluate due to insufficient curing, etc.

Pencil hardness test specified in JIS-K-5600-5-4 was made to evaluate strength of coating film.

Coating film was formed by inkjet method as follows. An ink was sealed in an aluminum pouch bag having the shape shown in FIG. 1 so as not to include air bubbles. The pouch bag was contained in a plastic cartridge shown in FIG. 2. In a chassis in which the cartridge was containable, an ink flow path was placed from the cartridge to an inkjet ejection head GEN 4 heads from Ricoh Industry Company, Ltd. to eject the ink to form a coating film. The ink ejection quantity was controlled such that the resultant coating film has the same thickness as that of the coating film formed by bar coating. The thickness of the coating film formed by bar coating was controlled by properly using the number of marketed wire winding bar.

Viscosities of the monomer and the compositions were measured by cone plate viscometer TV-22 from Toki Sangyo Co., Ltd., in which temperatures of constant temperature circulating water were set at 25, 45 and 60° C.

Example 2

The materials A to C were mixed at weight ratios shown in Table 3 to prepare an ink of Example 2.

Comparative Example 1

The materials A to C were mixed at weight ratios shown in Table 3 to prepare an ink of Comparative Example 1.

Example 3

The materials A to C were mixed at weight ratios shown in Table 3 to prepare an ink of Example 3.

Example 4

The materials A to C were mixed at weight ratios shown in Table 3 to prepare an ink of Example 4.

Example 5

The materials A to C were mixed at weight ratios shown in Table 4 to prepare an ink of Example 5.

Example 6

The materials A to C were mixed at weight ratios shown in Table 4 to prepare an ink of Example 6.

Example 7

The materials A to C were mixed at weight ratios shown in Table 4 to prepare an ink of Example 7.

Example 8

The materials A to C were mixed at weight ratios shown in Table 4 to prepare an ink of Example 8.

Example 9

The materials A to C were mixed at weight ratios shown in Table 4 to prepare an ink of Example 9.

Example 10

The materials A to C were mixed at weight ratios shown in Table 5 to prepare an ink of Example 1.

Example 11

The materials A to C were mixed at weight ratios shown in Table 5 to prepare an ink of Example 11.

Example 12

The materials A to C were mixed at weight ratios shown in Table 5 to prepare an ink of Example 12.

TABLE 3

| Material | | Example 1 | Example 2 | Comparative Example 1 |
|---|---|---|---|---|
| (A) | A1 | 50 | 50 | |
| Siloxane Compound | A2 | | | 50 |
| (B) | B1 | 50 | | 50 |
| Acrylic Monomer | B2 | | 50 | |
| (C) | C1 | 15 | 15 | |
| Polymerization | C2 | | | |
| Initiator | | | | |
| Carbon Black *1 | | | | |

TABLE 3-continued

| Material | | Example 1 | | | Example 2 | | | Comparative Example 1 | | |
|---|---|---|---|---|---|---|---|---|---|---|
| Viscosity (mPa·s @ 25° C.) | | 49 | | | 49 | | | 57 | | |
| Viscosity (mPa·s @ 45° C.) | | *2 | | | *2 | | | *2 | | |
| Viscosity (mPa·s @ 60° C.) | | 14 | | | 14 | | | 15 | | |
| Coating Film Thickness (μm) | | 20 | | | 20 | | | 20 | | |
| Acc. light Qty. (mJ/cm$^2$) | | 1000 | 2000 | 10000 | 1000 | 2000 | 10000 | 1000 | 2000 | 10000 |
| Inkjet | Pencil hardness | 2H | 3H | 4H | 2H | 3H | 4H | Less than 6B | Less than 6B | Less than 6B |
| | Contactness | Good | Good | Good | Good | Good | Good | Un-evaluable | Un-evaluable | Un-evaluable |
| Bar coating | Pencil hardness | 2H | 3H | 4H | 2H | 3H | 4H | Less than 6B | Less than 6B | Less than 6B |
| | Contactness | Good | Good | Good | Good | Good | Good | Un-evaluable | Un-evaluable | Un-evaluable |

*1: Includes carbon black #10 from Mitsubishi Chemical Corp. and a dispersant Solsperse 39000 from The Lubrizol Corp. at a weight ratio of 3/1.
*2: Besides the normal temperature (25° C.), only the inkjet ejection temperature was measured.

TABLE 4

| Material | | Example 3 | | | Example 4 | | |
|---|---|---|---|---|---|---|---|
| (A) Siloxane Compound | A1 | 50 | | | 50 | | |
| | A2 | | | | | | |
| (B) Acrylic Monomer | B1 | 50 | | | | | |
| | B2 | | | | 50 | | |
| (C) Polymerization Initiator | C1 | 15 | | | 15 | | |
| | C2 | | | | | | |
| Carbon Black *1 | | | | | | | |
| Viscosity (mPa·s @ 25° C.) | | 49 | | | 49 | | |
| Viscosity (mPa·s @ 45° C.) | | *2 | | | *2 | | |
| Viscosity (mPa·s @ 60° C.) | | 14 | | | 14 | | |
| Coating Film Thickness (μm) | | 10 | | | 10 | | |
| Acc. light Qty. (mJ/cm$^2$) | | 1000 | 2000 | 10000 | 1000 | 2000 | 10000 |
| Inkjet | Pencil hardness | H | 2H | 3H | H | 2H | 3H |
| | Contactness | Good | Good | Good | Good | Good | Good |
| Bar coating | Pencil hardness | H | 2H | 3H | H | 2H | 3H |
| | Contactness | Good | Good | Good | Good | Good | Good |

*1: Includes carbon black #10 from Mitsubishi Chemical Corp. and a dispersant Solsperse 39000 from The Lubrizol Corp. at a weight ratio of 3/1.
*2: Besides the normal temperature (25° C.), only the inkjet ejection temperature was measured.

TABLE 5

| Material | | Example 5 | | | Example 6 | | |
|---|---|---|---|---|---|---|---|
| (A) Siloxane Compound | A1 | 20 | | | 20 | | |
| | A2 | | | | | | |
| (B) Acrylic Monomer | B1 | 80 | | | | | |
| | B2 | | | | 80 | | |
| (C) Polymerization Initiator | C1 | 15 | | | 15 | | |
| | C2 | | | | | | |
| Carbon Black *1 | | | | | | | |
| Viscosity (mPa·s @ 25° C.) | | 14 | | | 14 | | |
| Viscosity (mPa·s @ 45° C.) | | *2 | | | *2 | | |
| Viscosity (mPa·s @ 60° C.) | | *2 | | | *2 | | |
| Coating Film Thickness (μm) | | 20 | | | 20 | | |
| Acc. light Qty. (mJ/cm$^2$) | | 1000 | 2000 | 10000 | 1000 | 2000 | 10000 |
| Inkjet | Pencil hardness | H | 2H | 3H | H | 2H | 3H |
| | Contactness | Good | Good | Good | Good | Good | Good |
| Bar coating | Pencil hardness | H | 2H | 3H | H | 2H | 3H |
| | Contactness | Good | Good | Good | Good | Good | Good |

*1: Includes carbon black #10 from Mitsubishi Chemical Corp. and a dispersant Solsperse 39000 from The Lubrizol Corp. at a weight ratio of 3/1.
*2: Besides the normal temperature (25° C.), only the inkjet ejection temperature was measured.

TABLE 8

| Material | | Example 7 | | | Example 8 | | |
|---|---|---|---|---|---|---|---|
| (A) Siloxane Compound | A1 | 20 | | | 20 | | |
| | A2 | | | | | | |
| (B) Acrylic Monomer | B1 | 80 | | | | | |
| | B2 | | | | 80 | | |
| (C) Polymerization Initiator | C1 | 15 | | | 15 | | |
| | C2 | | | | | | |
| Carbon Black *1 | | | | | | | |
| Viscosity (mPa·s @ 25° C.) | | 14 | | | 14 | | |
| Viscosity (mPa·s @ 45° C.) | | *2 | | | *2 | | |
| Viscosity (mPa·s @ 60° C.) | | *2 | | | *2 | | |
| Coating Film Thickness (μm) | | 40 | | | 40 | | |
| Acc. light Qty. (mJ/cm$^2$) | | 1000 | 2000 | 10000 | 1000 | 2000 | 10000 |
| Inkjet | Pencil hardness | 2H | 3H | 4H | 2H | 3H | 4H |
| | Contactness | Good | Good | Good | Good | Good | Good |
| Bar coating | Pencil hardness | 2H | 3H | 4H | 2H | 3H | 4H |
| | Contactness | Good | Good | Good | Good | Good | Good |

*1: Includes carbon black #10 from Mitsubishi Chemical Corp. and a dispersant Solsperse 39000 from The Lubrizol Corp. at a weight ratio of 3/1.
*2: Besides the normal temperature (25° C.), only the inkjet ejection temperature was measured.

TABLE 7

| Material | | Example 7 | Example 8 |
|---|---|---|---|
| (A) Siloxane Compound | A1 | 50 | 50 |
| | A2 | | |
| (B) Acrylic Monomer | B1 | 50 | 50 |
| | B2 | | |

TABLE 7-continued

| Material | | Example 7 | | | Example 8 | | |
|---|---|---|---|---|---|---|---|
| (C) Polymerization Initiator | C1 C2 | 15 | | | 15 | | |
| Carbon Black *1 | | | | | | | |
| Viscosity (mPa · s @ 25° C.) | | 51 | | | 55 | | |
| Viscosity (mPa · s @ 45° C.) | | *2 | | | *2 | | |
| Viscosity (mPa · s @ 60° C.) | | 15 | | | 16 | | |
| Coating Film Thickness (μm) | | 20 | | | 20 | | |
| Acc. light Qty. (mJ/cm²) | | 1000 | 2000 | 10000 | 1000 | 2000 | 10000 |
| Inkjet | Pencil hardness | 2H | 4H | 4H | F | 2H | 4H |
| | Contactness | Good | Good | Good | Good | Good | Good |
| Bar coating | Pencil hardness | 2H | 4H | 4H | F | 2H | 4H |
| | Contactness | Good | Good | Good | Good | Good | Good |

*1: Includes carbon black #10 from Mitsubishi Chemical Corp. and a dispersant Solsperse 39000 from The Lubrizol Corp. at a weight ratio of 3/1.
*2: Besides the normal temperature (25° C.), only the inkjet ejection temperature was measured.

TABLE 8

| Material | | Example 11 | | Example 12 | |
|---|---|---|---|---|---|
| (A) Siloxane Compound | A1 A2 | 50 | | 50 | |
| (B) Acrylic Monomer | B1 B2 | 50 | | 50 | |
| (C) Polymerization Initiator | C1 C2 | 5 | | 20 | |
| Carbon Black *1 | | | | | |
| Viscosity (mPa·s@25°C.) | | 45 | | 52 | |
| Viscosity (mPa·s@45°C.) | | *2 | | *2 | |
| Viscosity (mPa·s@60°C.) | | 15 | | 15 | |
| Coating Film Thickness (μm) | | 20 | | 20 | |
| Acc. light Qty. (mJ/cm2) | | 10000 | 1000 | 2000 | 10000 |
| Inkjet | Pencil hardness | 3H | 2H | 3H | 4H |
| | Contactness | Good | Good | Good | Good |
| Bar coating | Pencil hardness | 3H | 2H | 3H | 4H |
| | Contactness | Good | Good | Good | Good |

*1: Includes carbon black #10 from Mitsubishi Chemical Corp. and a dispersant Solsperse 39000 from The Lubrizol Corp. at a weight ratio of 3/1.
*2: Besides the normal temperature (25°C.), only the inkjet ejection temperature was measured.

Table 3 proves that a compound having a structural unit having the formula (HO)$_2$(R)Si.O[—Si(R)(OH).O-]n-Si(R)(OH)$_2$, wherein R represents a methacryloyl group; and n represents 0 or 1 as a polymerizable compound having a —Si—O— skeleton enables an ink to have high coating strength. Both of Examples 1 and 2 have good results. Monomers having no skin sensitization problem are preferably used in terms of safety. This is the same in all the Examples.

Table 4 proves that a compound having a structural unit having the formula (HO)$_2$(R)Si.O[—Si(R)(OH).O-]n-Si(R)(OH)$_2$, wherein R represents a methacryloyl group; and n represents 0 or 1 enables an ink to have high coating strength even when the coating film is thinner. When a substrate is coated, the coating film at the end of the substrate is visibly bulges according to the coating process. In terms of improvement of design, even the thinner coating film preferably has higher strength.

Table 5 proves that a compound having a structural unit having the formula (HO)$_2$(R)Si.O[—Si(R)(OH).O-]n-Si(R)(OH)$_2$, wherein R represents a methacryloyl group; and n represents 0 or 1 enables an ink to have high coating strength even when dilution ratios of low-viscosity monomers are different from each other. Particularly, when inkjet does not have sufficient ejectability or build-up time is shortened, an ink preferably has high coating strength even when having sufficiently low viscosity.

Table 6 proves that a compound having a structural unit having the formula (HO)$_2$(R)Si.O[—Si(R)(OH).O-]n-Si(R)(OH)$_2$, wherein R represents a methacryloyl group; and n represents 0 or 1 enables an ink to have high coating strength even when the coating film is thick. A thick coating film is easy to have uniformity. However, the contactness occasionally lowers because hardening contraction becomes large. Therefore, an ink preferably has high coating strength while keeping high contactness even when being thick. Even when the polycarbonate as the substrate was replaced with ABS ABS-1100-N1-G (1 mm thick), polyvinylchloride Esuviron Plate 1-500 (1 mm thick) and polystyrene PS-2000-W1-G (1 mm thick) from Sekisui Seikei Co., Ltd., the results were the same.

Compared with Examples 1, 9, 11 and 12, the ink was proved to have sufficiently high coating film even when the polymerization initiators or their compound ratios are different from each other.

Example 10 proves that even an ink including carbon black as a colorant is able to improve water resistance of the coating film. Even when the carbon black was replaced with a yellow pigment Toner yellow HG from Clariant (Japan) K.K., a magenta pigment CINQUASIA MAGENTA L4540 from BASF, and a cyan pigment Lionogen Blue LX-8091 from Toyo Color Co., Ltd., the results were the same.

In addition, in all the Examples, the coating film after irradiated had good contactness.

Having now fully described the invention, it will be apparent to one of ordinary skill in the art that many changes and modifications can be made thereto without departing from the spirit and scope of the invention as set forth therein.

What is claimed is:

1. A method of preparing a cured material, comprising:
   curing a radical polymerizable composition with UV light from a LED, the radical polymerizable composition comprising:
   a siloxane compound represented by formula (1):

$$(HO)_2(R)Si.O[—Si(R)(OH).O-]n-Si(R)(OH)_2 \qquad (1)$$

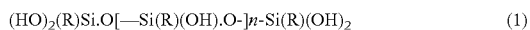

wherein R represents a methacryloyl group; and n represents 0 or 1; and
   a monomer having a viscosity lower than that of the siloxane compound.

2. The method of claim 1, wherein the monomer is diethyleneglycol dimethacrylate.

3. The method of claim 1, wherein the radical polymerizable composition further comprises at least one of a colorant and a filler.

4. The method of claim 3, wherein the radical polymerizable composition further comprises a polymerization initiator, wherein
   the radical polymerizable composition comprises the siloxane compound in an amount of from 20 to 50 parts by weight,
   the diethyleneglycol dimethacrylate in an amount of from 50 to 80 parts by weight, and
   the polymerization initiator in an amount of from 5 to 20 parts by weight per 100 parts by weight of the siloxane compound and the diethyleneglycol dimethacrylate.

5. The method of claim 1, further comprising:
   coating a substrate with the radical polymerizable composition to form a coating film having a thickness of from 10 to 40 mm on the substrate,
   wherein said coating is carried out prior to said curing.

6. The method of claim 1, wherein the radical polymerizable composition has a viscosity of from 2 to 150 mPa·s at 25° C.

7. The method of claim 1, wherein n represents 0.

8. The method of claim 1, wherein n represents 1.

9. The method of claim 1, wherein the radical polymerizable composition further comprises a colorant.

10. The method of claim 1, wherein the radical polymerizable composition further comprises a filler.

11. The method of claim 10, wherein the filler is at least one member selected from the group consisting of a sulfuric acid salt of an alkaline earth metal; a carbonic acid salt of an alkaline earth metal; silica; calcium silicate; alumina; alumina hydrate; titanium oxide; zinc oxide; talc; and clay.

* * * * *